United States Patent Office 3,739,014
Patented June 12, 1973

3,739,014
STABILIZERS FOR CELLULAR POLYURETHANES
Gunter Oertel, Cologne-Flittard, Manfred Dahm, Leverkusen, Manfred Holtschmidt, Leverkusen-Steinbuechel, and Manfred Roegler, Bad Godesberg, assignors to Bayer Aktiengesellschaft, Leverkusen, Germany
No Drawing. Filed Feb. 25, 1969, Ser. No. 802,246
Claims priority, application Germany, Mar. 1, 1968, P 16 94 248.6
Int. Cl. C07c 125/06
U.S. Cl. 260—472  5 Claims

ABSTRACT OF THE DISCLOSURE

Non-ionic foam stabilizers for polyester polyurethane foams are obtained by linking hydrophobic amines or amides with polyethers containing ethylene oxide.

---

This invention relates to the stabilization of cellular polyurethanes, the stabilizers employed and to the resulting polyurethane products.

The production of polyurethane foams from polyesters, isocyanates, blowing agents, catalysts, foam stabilizers and other additives is already known. The foam stabilizers used industrially are mostly ionic compounds, such as sodium castor oil sulphonate. These products have the disadvantage of lowering the resistance of the resulting polyester foams, particularly to hydrolysis and hence there is a need for non-ionic foam stabilizers. The only non-ionic foam stabilizers which have hitherto found acceptance are certain polyether siloxanes. The products have to be synthesized depending on the type of polyester used, from polysiloxanes of a particular structure and particular molecular weight and polyethers which have a particular ratio of ethylene oxide to propylene oxide and a particular molecular weight. The relative inaccessability of polysiloxanes and the expense involved in the process of linking them with polyethers make these products relatively uneconomical. Moreover, the majority of polyether siloxanes are unstable when mixed with the amine catalysts and water used for the production of the foams, owing to the susceptibility to hydrolysis of the Si—O—C bonds which link the siloxane and polyether. The time available for working up such mixtures on an industrial scale is thereby considerably limited.

It is also known to use oxyethylated stearic acid, condensation products of long chain alcohols and phenols with ethylene oxide, polyoxyethylated vegetable oils and the reaction products of amines and long chain fatty acid, such as mono- and di-ethanolamides of the acid of coconut oil, oleic acid and stearic acid as non-ionic additives for polyurethane foams. All these products, however, have very little or no foam stabilizing effect in the production of polyurethane foams based on polyesters. In fact, they act as emulsifiers for the dispersion of the water which is used as a blowing agent in the polyester/isocyanate mixture.

A foam stabilizer acts by lowering the surface tension of the system which is to be stabilized, and is normally coupled with an emulsifying effect but a compound which is an emulsifier for water in polyester/isocyanate mixtures is not necessarily a stabilizer for the production of foams. Comparison tests showed that the above-mentioned products lower the surface tension of polyesters only slightly if at all and hence the lack of any significant stabilizing effect which has been observed in practice and confirmed by comparison tests (see below) is understandable.

It is therefore an object of this invention to provide compositions useful as stabilizers for polyester polyurethane foams. It is another object to provide cell stabilized polyurethane foam. It is another object to provide an improved process for preparing polyester polyurethane foam.

The foregoing objects and others which will become apparent from the following description are accomplished in accordance with this invention, generally speaking, by providing foam stabilizers and polyester-urethane foams utilizing the non-ionic stabilizers obtained by linking hydrophobic amines or amides with polyethers containing ethylene oxide. The non-ionic foam stabilizers have the formula

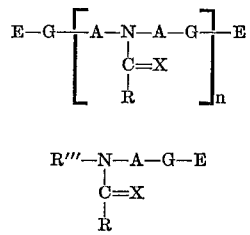

or $$R'''—N—A—G—E$$
$$|$$
$$C=X$$
$$|$$
$$R$$

wherein

R is alkyl, alkenyl, cycloalkyl, aralkyl or aryl having 6 to 20 carbon atoms;
A is alkylene having 2 to 10 carbon atoms;
X is oxygen or two hydrogen atoms;
n is an integer of 1 to 30;
G is —O—, —OOC—NH—R'—NH—COO— or
—OOC—R'—COO—
where R' is alkylene or arylene having 2 to 20 carbon atoms;
E is the group —D—R" where R" is an hydroxyl, alkoxy or aryloxy group having 1 to 6 carbon atoms; and D is the radical of a polyether composed of 30 to 100% ethylene oxide and 0 to 70% of another mono-epoxide, preferably propylene oxide with a molecular weight of 200 to 10,000, preferably 1,000 to 3,000; and
R''' is an alkyl, alkenyl, cycloalkyl, aralkyl or aryl radical having 1 to 20 carbon atoms.

The stabilizers described are used in the preparation of polyurethane foams from polyesters, organic polyisocyanates, chain lengthening agents, activators, etc.

In the general formula given above, the radicals R, R', R", R''', A and D may have the following particular meanings, inter alia, for example:

R is hexyl, octadecyl, heptenyl, cyclohexyl, 4-isopropylcyclohexyl, benzyl, β-phenylethyl, isononylphenyl, dodecylphenyl, naphthyl or the like;
R' is ethylene, tetramethylene, hexamethylene, phenylene, toluylene, diphenylene, diphenylenemethane, naphthylene, xylylene or the like;
R" is hydroxyl, methoxy, butoxy, hexoxy, phenoxy or the like;
R''' is methyl, butyl, cyclopentyl, hexyl, octadecyl, heptenyl, octadecenyl, 4-isopropyl-cyclohexyl, benzyl, β-phenylethyl, isononylphenyl, dodecylphenyl naphthyl, or the like;
A is ethylene, propylene-1,2, butylene-1,2, butylene-2,3, 3-chloropropylene-1,2, phenylethylene, cyclohexylene-1,2, tetramethylene, hexamethylene or the like;
D is a homopolymer of ethylene oxide having an average molecular weight of 200; 400; 800; 1,700; 4,000 or 7,000 or copolymers of 90 mols percent of ethylene oxide and 10 mols percent of propylene oxide
80 mols percent of ethylene oxide and 20 mols percent of propylene oxide
60 mols percent of ethylene oxide and 40 mols percent of propylene oxide 30 mols percent of ethylene oxide and 70 mols percent of propylene oxide 80 mols percent of ethylene oxide and 20 mols percent of 2,3-butylene oxide

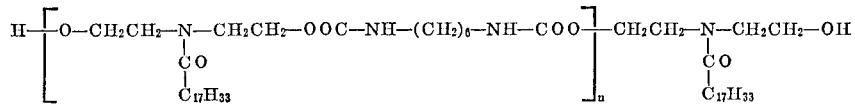

50 mols percent of ethylene oxide and 50 mols percent of 3-chloro-propylene oxide-1,2

90 mols percent of ethylene oxide and 10 mols percent of phenylethylene oxide 60 mols percent of ethylene oxide and 40 mols percent of cyclohexane oxide-1,2

40 mols percent of ethylene oxide and 60 mols percent of phenoxypropylene oxide 60 mols percent of ethylene oxide and 30 mols percent of propylene oxide+10% phenyl ethylene oxide, having the above mentioned average molecular weights.

Instead of copolymers, block polymers of the above mentioned overall composition may be used.

The foam stabilizers which can be used according to the invention are new materials and can be prepared by various processes. Generally, the procedure consists in combining the hydrophobic starting material which contains amine or amide groups with the hydrophilic polyether radicals of the type characterized above via ether, ester or urethane groups. The following compounds are given as examples of such foam stabilizers:

(1) The reaction product of 1 mol of N,N-di-β-hydroxyethyldodecylamine and 10 mols of ethylene oxide.

(2) The reaction product of 1 mol of stearic acid di-2-hydroxyethylamide and a mixture of 10 mols of ethylene oxide and 3 mols of propylene oxide.

(3) The reaction product of 1 mol of N,N-di-β-hydroxypropylbenzylamine and a mixture of 12 mols of ethylene oxide, 4 mols of propylene oxide and 6 mols of butylene oxide.

(4) The reaction product of 1 mol of N,N-di-2-hydroxybutylcyclohexylamine and 30 mols of ethylene oxide.

(5) The reaction product of 1 mol of a basic polyether of the formula

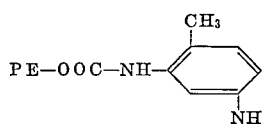

of OH number 60 and average molecular weight 1,850 which has been prepared in known manner from N-dodecyl diethanolamine by polyetherification at 200° C., and a mixture of 50 mols of ethylene oxide and 30 mols of propylene oxide.

(6) The reaction product of 1 mol of a polyester of the formula

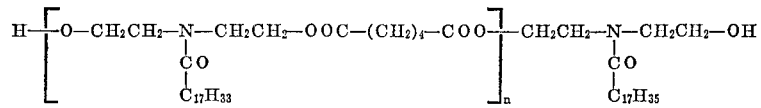

of OH number 100 and average molecular weight 1,120 which has been prepared from stearic acid di-2-hydroxyethylamide and adipic acid by polyesterification in known manner and a mixture of 20 mols of ethylene oxide and 5 mols of propylene oxide.

(7) The reaction product of 1 mol of a polyurethane of the formula

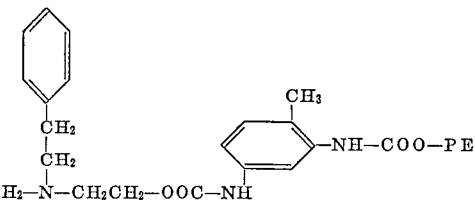

of OH number 86 and average molecular weight 1,300 which has been prepared from oleic acid di-2-hydroxyethylamide and hexamethylene diisocyanate in known manner and a mixture of 40 mols of ethylene oxide and 30 mols of propylene oxide.

(8) The reaction product of 1 mol of N,N-di-2-hydroxyethyl-β-phenylethylamine, 2 mols of toluylene-2,4-diisocyanate and 2 mols of a monofunctional polyether of OH number 36 and average molecular weight 1,550 which has been prepared in known manner from n-butanol by oxyalkylation with a mixture of 70 mol percent of ethylene oxide and 30 mol percent of propylene oxide in known manner. The product has the formula

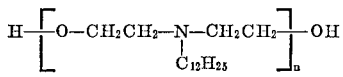

in which PE=polyether of the type defined above.

(9) The reaction product, which is analogous to 8, using N,N-di-2-hydroxyethyl-cyclohexylamine, N,N-di-2-hydroxyethyl-4-dodecylaniline or N,N-di-2-hydroxy-1-phenylethyl-tetradecylamine instead of N,N-di-2-hydroxyethyl-β-phenylethylamine as starting amine and 1, 4-phenylenediisocyanate, 4,4'-diphenylmethane diisocyanate, 1,4-xylylene diisocyanate or hexamethylene diisocyanate as the bridge member instead of toluylene-2,4-diisocyanate, and monofunctional polyethers which average molecular weights of 200 to 5,000 and which have been prepared from methanol, propanol or phenol by oxyalkylation wtih mixtures of 30 to 100% of ethylene oxide and 0 to 70% of propylene oxide in known manner instead of with the special polyethers mentioned above.

(10) The reaction products of 1 mol of stearic acid di-2-hydroxyethylamide, benzoic acid di-2-hydroxy-1-phenylethylamide or dodecanoic acid di-2-hydroxypropylamide with 2 mols each of the diisocyanates and monofunctional polyethers given in 8 and 9.

(11) The reaction products of 1 mol of the basic polyether given in 5 or the corresponding basic polyether of di-2-hydroxyethylcyclohexylamine, di-2-hydroxyethyl aniline or di-2-hydroxyethyloleylamine, each with 2 mols of the diisocyanates given under 8 and 9 and monofunctional polyethers.

(12) The reaction products of 1 mol of the polyester given in 6 or a corresponding polyester of oleic acid di-2-hydroxyethylamide, benzoic acid di-2-hydroxyethylamide, naphthoic acid di-2-hydroxypropylamide or octanoic acid di-2-hydroxyethylamide as one reactant with adipic acid, phthalic acid, terephthalic acid, isophthalic acid or glutaric acid as the other, in each case with 2 mols of the diisocyanates and monofunctional polyethers given in 8 and 9.

(13) The reaction products of one mol of the polyurethane given in 7 or the corresponding polyurethanes of dodecanoic acid di-2-hydroxyethylamide or palmitic acid di-2-hydroxyethylamide as one reactant with hexamethylene diisocyanate, toluylene diisocyanate, xylylene diisocyanate and diphenylmethane-4,4'-diisocyanate as the other with the diisocyanates and monofunctional polyethers given in 9.

(14) The reaction products of 1 mol of a basic polyester of the formula

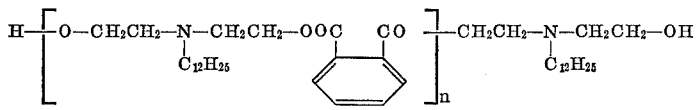

of OH number 56 and average molecular weight 2,000 which has been obtained from di-2-hydroxyethyl-dodecylamine and phthalic acid by polycondensation in known manner, with 2 mols each of the diisocyanates and monofunctional polyethers given in 8 and 9.

(15) The reaction products of polyesters of 1 mol each of the basic polyethers given as starting materials in 5 and 11, the polyesters given in 6, 12 and 14 or the polyurethanes given in 7 and 13, with, in each case 2 mols of a dicarboxylic acid, such as adipic acid, phthalic acid or terephthalic acid and in each case with 2 mols of one of the monofunctional polyethers given in 8 and 9.

The foam stabilizers which may be used according to the invention are thin liquids or viscous oils, resins or even waxes, depending on the choice of the starting materials. They are soluble both in water and in most of the polyesters normally used for the production of polyurethane foams and they can be stored practically indefinitely in bulk. They are also sufficiently stable in aqueous solution when in the presence of the amine catalysts which are usually used for the production of foams.

The foam stabilizers for use according to the invention are used in admixture with the usual linear or branched polyesters, polyisocyanates, catalysts, blowing agents and other additives. As they exert both an emulsifying and a foam stabilizing effect, they may be used alone or in admixture with known emulsifiers or together with polyether siloxanes.

Suitable starting materials for the production of polyurethane foams by the process according to the invention are linear or branched polyesters which have primary and/or secondary hydroxyl groups and an OH equivalent weight preferably of 100 to 3,000, the OH equivalent weight being the weight of the polyester in grams which contains one mol of hydroxyl groups. The polyesters are produced by the usual polycondensation of dicarboxylic acids or their anhydrides, alone or in admixture with tri- or poly-carboxylic acids, with diols which may be alone or in admixture with other polyvalent hydroxyl compounds, such as glycerol, trimethylolpropane, pentaerythritol, castor oil or hexanetriol-1,2,6. The dicarboxylic acids used may be either saturated or unsaturated compounds and either aliphatic or aromatic. Examples of such acids are oxalic acid, succinic acid, glutaric acid, adipic acid, pimelic acid, maleic acid, fumaric acid, phthalic acid, terephthalic acid of dimerized fatty acids which contain 36 carbon atoms. The following are given as examples of suitable diols: ethylene glycol, diethylene glycol, triethylene glycol, polyethylene glycols, propylene glycol, dipropylene glycol, polypropylene glycols, butane-1,4-diol, butene-(2)-diol-(1,4), butyne-(2)-diol-(1,4), hydroquinone or 4,4'-dihydroxy-diphenylmethane. The higher molecular weight polyhydroxyl compounds may also be used in admixture with other polyvalent hydroxyl compounds such as ethylene glycol, 1,4-butylene glycol, glycerol, trimethylolpropane, pentaerythritol or castor oil.

Suitable polyisocyanates are any aliphatic, araliphatic or aromatic polyisocyanates, e.g., m- or p-phenylene diisocyanates, 2,4- or 2,6-tolylene diisocyanates, diphenylmethane-4,4'-diisocyanate, 4,4'-bisphenylenediisocyanate, 1,5-naphthylene diisocyanate, 1,6-hexamethylene diisocyanate or 1,10-decamethylene diisocyanate; adducts of polyisocyanates with alcohols such as trimethylolpropane, glycerol, hexane-1,2,6-triol or with low molecular weight polyesters such as castor oil, which polyisocyanate adducts contain free NCO groups; reaction products of the above isocyanates with acetals according to the process of German patent specification 1,072,385 and the isocyanates mentioned in German patent specifications 1,022,789 and 1,027,394; the above mentioned isocyanates may, of course, be used in any desired mixture. Particularly suitable polyisocyanates are those polyphenyl polymethylene polyisocyanates which are obtained by aniline formaldehyde condensation followed by phosgenation. 2,4- and 2,6-toluylene diisocyanates as well as mixtures of these isomers are also especially advantageous for use in the invention.

As a blowing agent water is used, alone or in combination with low boiling solvents, such as methylene chloride, chloroform, trichlorofluoromethane or dichlorodifluoromethane, etc. The catalysts used are preferably tertiary amines, such as dimethylbenzylamine, N-alkylmorpholines, N,N-dialkyl piperazine, N,N'-endoethylene-piperazine, N,N - dimethylcyclohexylamine, dimethylethanolamine, N,N-dimethyl-β-phenyl ethylamine, triethylamine; or bases which do not contain nitrogen, such as alkalies, alkali metal phenolates or alkaline earth metal oxides; salts of amines with organic acids may also be used. Metal catalysts as given in German patent specification 958,774; German Auslegeschrift 1,028,773 and French patent specification 1,240,863 are also suitable for use in the process of the invention. Additives for regulating the pore size and cell structure may be added as may fillers, dyes or plasticizers be used.

The foam production itself is carried out by known procedures at room or elevated temperatures, simply by mixing the polyisocyanates with the higher molecular weight polyesters, including the other auxiliary materials mentioned above. It is advantageous to use mechanical devices for this, e.g., those described in French patent specification 1,074,713.

The foam stabilizers which are used according to the invention may be added in different quantities to the foamable reaction mixtures, depending on their reactivity. Quantities of 0.05 to 5% and preferably quantities of 0.1 to 3%, based on the polyester would usually be employed.

The superiority of the foam stabilizers used according to the invention over the known emulsifiers is confirmed by the following comparison tests and examples in which parts are by weight unless otherwise specified.

COMPARISON TEST 1

The effect of the foam stabilizer which has been prepared according to Example 1(a) (see below) and which is used according to the invention, on the surface tension of a commercial polyester of adipic acid, diethylene glycol and trimethylolpropane (OH number 60, molecular weight 2,500) is compared with the following four known emulsifiers:

Compound A: Stearic acid monoethanolamide
Compound B: The reaction product of 1 mol of nonyl phenol and 87 mols of ethylene oxide
Compound C: Oxyethylated fatty alcohol
Compound D. The reaction product of n-butanol and 50 mol percent of propylene oxide and 50 mol percent of ethylene oxide of OH number 36 and average molecular weight 1550.

METHODS OF MEASUREMENT

The surface tension was determined by the tearing method of Lecomte De Nouy.

RESULTS OF MEASUREMENTS

| Polyester: | Concentration (weight percent) | Surface tension (dyn/cm.) |
|---|---|---|
| Without additive | | 56.6 |
| With compound according to the invention (Example 1(a)) | 1.5 | 43.0 |
| With Compound A | 1.5 | 52.8 |
| With Compound B | 1.5 | 56.4 |
| With Compound C | 1.5 | 51.2 |
| With Compound D | 1.5 | 48.4 |

It is clear from the results of these surface tension measurements that the compound which is used according to the invention has the largest effect in lowering the surface tension of the polyester.

COMPARISON TEST 2

Using the compound prepared according to Example 1(a) and compounds A, B, C and D, a foam plastic is produced in each case under the same conditions, mixing the components by hand.

FOAM PLASTIC COMPOSITION

About 100 parts of a slightly branched polyester which has been obtained by condensation of adipic acid with diethylene glycol and trimethylolpropane (OH number 60, average molecular weight 2,500)
About 4 parts of water
About 1 part of dimethyl benzylamine
About 1 part of foam stabilizer
About 50 parts of tolylene diisocyanate (65% 2,4- and 35% 2,6-isomer)

TEST RESULTS

| Foam stabilizer | Formation of foam/nature of foam |
|---|---|
| Compound according to the invention (Example 1(a)) | Normal foam formation, very fine, regular cell structure. |
| Compound A | Foam formation takes place on boiling, very coarse, irregular cell structure. |
| Compound B | Normal foam formation, glassy and coarse cell structure. |
| Compound C | Normal foam formation, coarse and irregular cell structure. |
| Compound D | Foam formed after completion of the blowing reaction, slightly coarse cell structure. |

The comparison test shows clearly the superiority of the compound according to the invention, since a foam stabilizer should stabilize the foam both during its gel phase, preventing it from coagulating, and to stabilize the gas formation so that a foam with a very fine regular cell structure is produced.

Example 1

(a) Preparation of foam stabilizer.—About 5000 parts of a polyether of OH number 34 which has been prepared from n-butanol by oxyalkylation with a mixture of 50 mol percent of ethylene oxide and 50 mol percent of propylene oxide are added at room temperature to about 2000 parts of tolylene diisocyanate (isomeric mixture of 80% toluylene-2,4-diisocyanate and 20% of tolylene-2,6-diisocyanate) in a 10 liter three-necked flask equipped with cooler, thermometer and dropping funnel. The reaction mixture is stirred for about 5 hours at about 70° C. and is then distilled using a thin layer evaporator at about 145° C. and 0.5 mm. Hg to remove excess tolylene diisocyanate. After the reaction mixture has been passed through the evaporator three times, the desired polyether isocyanate is obtained in the form of a pale yellow, clear oil. Yield: 5500 parts, NCO content: cal. 2.4%, found 2.5%. Density: 1.070 at 20° C., $n_D^{20}$ 1.4765.

About 4580.5 parts of the resulting polyether isocyanate are added to about 503.5 parts of 5-(2-hydroxyethyl)-oleylamine at room temperature over 1 to 2 hours. A slightly exothermic reaction results, the temperature of the reaction mixture rising to about 30° C. After about 3 hours' stirring at about 20 to about 30° C., the reaction is terminated. Yield: 5084 parts of a clear, yellow oil, OH number 3 to 4, NCO number 0.

$$cP_{60} = 830$$

(b) Process according to the invention.—About 0.5 part of the compound prepared according to 1(a) is mixed in the mixing chamber of a foaming machine with:

About 100 parts of a slightly branched polyester which has been obtained by condensation of adipic acid with diethylene glycol and trimethylolpropane (molecular weight 2,500, hydroxyl number 60)
About 3 parts of water
About 2 parts of N-methylmorpholine
About 40 parts of tolylene diisocyanate (65% 2,4- and 35% 2,6-isomer)

Seven seconds after leaving the mixing chamber, the mixture becomes cloudy and foam formation starts. This foam formation is completed after a further 60 seconds. The resulting foam has a very fine cell structure and has the following mechanical properties:

| | |
|---|---|
| Density kg./m.$^3$ | 42 |
| Tensile strength kg. wt./cm.$^2$ | 1.2 |
| Elongation at break percent | 115 |
| Compression deflection (at 40% deflection) p./cm.$^2$ | 83 |
| Compression set (22 hours, 70° C., 90%) percent | 6.6 |

Example 2

The components listed below are stirred together in a mixing chamber and the resulting reaction mixture is introduced into molds or placed on the conveyor band of a foaming machine.

About 100 parts of a slightly branched polyester obtained by condensation of adipic acid with diethylene glycol and trimethylolpropane (molecular weight 2,500, hydroxyl number 60)
About 5 parts of water
About 1.7 parts of N-methylmorpholine
About 0.5 part of the compound prepared according to 1(a) and
About 60 parts of tolylene diisocyanate (65% 2,4- and 35% 2,6-isomer).

Foam formation begins after 8 seconds, and after 51 seconds a very finely cellular soft elastic foam which has the following physical properties has formed:

| | |
|---|---|
| Density kg./m.$^3$ | 26 |
| Tensile strength kg. wt./cm.$^2$ | 0.9 |
| Elongation at break percent | 100 |
| Compression deflection (at 40% deflection) p./cm.$^2$ | 56 |
| Compression set (22 hours, 70° C., 90%) percent | 8.5 |

Example 3

(a) Preparation of the foam stabilizer.—About 111.3 parts of stearic acid-di-(2-hydroxyethyl)-amide are condensed for about 10 hours at about 170–190° C. in the presence of about 0.5 part of phosphorus acid, nitrogen being passed through the mixture. When all the water has been removed, about 108 parts of the desired polyether is obtained in the form of a colorless oil of OH number 88 which solidifies to a wax at room temperature.

About 66 parts of this polyether are mixed with about 149 parts of the polyether isocyanate prepared according to Example 1(a) and heated to about 90° C. for about 30 minutes. The resulting product is a wax which is almost colorless when cold.

(b) Process according to the invention.—About 0.25 part of the compound prepared according to Example 3(a) is intimately mixed with the following components:

About 100 parts of slightly branched polyester obtained by condensation of adipic acid with diethylene glycol and trimethylolpropane (molecular weight 2,500, hydroxyl number 60)
About 1.3 parts of dimethylbenzylamine,
About 3 parts of water and
About 40 parts of tolylene diisocyanate (80% 2,4- and 20% 2,6-isomer).

The mixture becomes cloudy after 5 seconds and a fine cellular white foam which attains its maximum height after 70 seconds is formed. It has good mechanical properties.

Example 4

(a) Preparation of the foam stabilizer.—A mixture of about 497 parts of N-oleyl-diethanolamine and about 175.2 parts of adipic acid is heated to about 150 to about 160° C. while nitrogen is passed through. About 40 parts of water distill off over 5 hours over a distillation bridge. About 641 parts of the required polyester remain in the residue in the form of a brown oil which has an OH number of 44.

About 300 parts of this polyester are mixed with about 342 parts of the polyether isocyanate prepared according to Example 1(a) and this is heated to about 90° C. for about 30 minutes. The resulting product is a clear yellow oil ($n_D^{20}=1.4788$).

(b) Process according to the invention.—About 0.5 part of the compound prepared according to (4a) is intimately mixed with the following components, using a mechanical stirrer:

About 100 parts of a slightly branched polyester obtained by condensation of adipic acid with diethylene glycol and trimethylolpropane (molecular weight 2500, hydroxyl number 60),
About 1.25 parts of dimethylbenzylamine,
About 3 parts of water and
About 40 parts of tolylene diisocyanate (65% 2,4- and 35% 2,6-isomer).

Foam formation starts after about 5 seconds and is completed 70 seconds later. The fine cellular foam obtained has the following mechanical properties:

Density _____kg./m.³__ 38
Tensile strength _____kg. wt./cm.²__ 1.2
Elongation at break _____percent__ 125
Compression deflection (at 40% deflection)
                                                p./cm.²__ 73
Compression set (22 hours, 70° C., 50%) _percent__ 6.4

Example 5

(a) Preparation of the foam stabilizer.—About 224 parts of a basic polyether of OH number 69 which has been prepared from N-oleyl-diethanolamine by polycondensation in the presence of 1% of phosphorus acid at about 180 to about 200° C. are mixed with about 400 parts of the polyether isocyanate prepared according to Example 1(a) and the mixture is heated at about 90° C. for about 30 minutes. The resulting product is a clear yellow oil ($n_D^{20}=1.4798$).

(b) Process according to the invention.—About 0.25 part of the compound prepared according to 4(a) is intimately mixed with the other components given below:

About 100 parts of a slightly branched polyester obtained by condensation of adipic acid with diethylene glycol and trimethylolpropane (molecular weight 2,500, hydroxyl number 60),
About 1.25 parts of dimethylbenzylamine,
About 3 parts of water and
About 40 parts of tolylene diisocyanate (65% 2,4- and 35% 2,6-isomer).

Foam formation starts after 5 seconds and is finished after 65 seconds. A fine cellular soft polyester foam which has the following mechanical properties is formed:

Density _____kg./m.³__ 42
Tensile strength _____kg. wt./cm.²__ 1.0
Elongation at break _____percent__ 110
Compression deflection (at 40% deflection)
                                                p./cm.²__ 89
Compression set (22 hours, 70° C., 50%) _percent__ 4.1

Example 6

(a) Preparation of the foam stabilizer.—A polyether of OH number 36 which has been prepared from n-butanol by oxyalkylation with a mixture of 70 mol percent of ethylene oxide and 30 mol percent of propylene oxide by a procedure analogous to that described in Example 1(a) is reacted with toluylene diisocyanate to form a polyether isocyanate. The polyether isocyanate is a pale yellow oil which has an NCO content of 3.2% and a refractive index of 1.4793 at 20° C.

About 425 parts of a basic polyether of OH number 23 which has been prepared from N-oleyl-diethanolamine by polycondensation in the presence of 1% phosphorus acid at about 180 to about 200° C. are mixed with about 230 parts of the polyether isocyanate and the mixture is heated at about 90° C. for about 30 minutes. The resulting product is a pale brown, clear oil ($n_D^{20}=1.4788$).

(b) Process according to the invention.—About 0.1 part of the compound prepared according to 6(a) is intimately mixed with the following components, using a mechanical stirrer:

About 100 parts of a slightly branched polyester obtained by condensation of adipic acid with diethylene glycol and trimethylolpropane (molecular weight 2500, hydroxyl number 60),
About 1.25 parts of dimethylbenzylamine,
About 3 parts of water and
About 40 parts of tolylene diisocyanate (65% 2,4- and 35% 2,6-isomer).

Foam formation starts after 5 seconds and finishes after 68 seconds. A fine cellular foam which has the following mechanical properties is formed:

Density _____kg./m.³__ 42
Tensitle strength _____kg. wt./cm.²__ 1.4
Elongation at break _____percent__ 160
Compression deflection (at 40% deflection)
                                                p./cm.²__ 79
Compression set (22 hours, 70° C., 50%) _percent__ 4.9

Example 7

(a) Preparation of the foam stabilizer.—About 230 parts of the polyisocyanate prepared according to Example 6(a) are mixed with about 141.5 parts of the basic polyether of OH number 69 given in Example 5(a) and heated at about 90° C. for about 30 minutes. The reaction product is a clear yellow oil which has a refractive index of 1.4810 at 20° C.

(b) Process according to the invention.—About 0.15 part of the compound prepared according to 7(a) is intimately mixed with the following components, using a mechanical stirrer:

About 100 parts of a slightly branched polyester obtained by condensation of adipic acid with diethylene glycol and trimethylol propane (molecular weight 2,500, hydroxyl number 60),
About 1.25 parts of dimethylbenzylamine,
About 3 parts of water and
About 40 parts by weight of tolylene diisocyanate (65% 2,4- and 35% 2,6-isomer).

Foam formation starts after a mixing time of 5 seconds and is completed after 70 seconds. The very fine cellular soft polyester foam which is formed has the following physical properties:

Density _____kg./m.³__ 42
Tensile strength _____kg. wt./cm.²__ 1.2
Elongation at break _____percent__ 125
Compression deflection (at 40% deflection)
p./cm.²__ 84
Compression set (22 hours, 70° C., 50%) _percent__ 10

Example 8

(a) Preparation of the foam stabilizer.—Employing a procedure analogous to that described in Example 1(a), a polyether of OH number 30 which has been prepared from n-butanol by reaction with a mixture of 90 mol percent of ethylene oxide and 30 mol percent of propylene oxide is reacted with toluylene diisocyanate to form a polyether isocyanate. The polyether isocyanate is a pale yellow wax which has an NCO content of 3.7%.

About 287 parts of the basic polyester of OH number 44 prepared according to Example 4(a) are mixed with about 225 parts of the polyether isocyanate and heated at about 100° C. for about 20 minutes. The resulting product is a pale yellow wax.

(b) Process according to the invention.—About 0.5 part of the compound prepared according to (8a) is intimately mixed with the following components, using a mechanical stirrer:

About 100 parts of a slightly branched polyester of adipic acid, diethylene glycol and trimethylolpropane (molecular weight 2,500, hydroxyl number 60),
About 1.25 parts of dimethylbenzylamine.
About 3 parts of water and
About 40 parts of tolylene diisocyanate (65% 2,4- and 35% 2,6-isomer).

Foam formation starts when the mixture has been stirred for 5 seconds and finishes after 67 seconds. A fine cellular, soft polyester foam which has the following physical properties was formed:

Density _____kg. wt./m.³__ 35
Tensile strength _____kg. wt./cm.²__ 1.3
Elongation at break _____percent__ 170
Compression deflection (at 40% deflection)
p./cm.²__ 63
Compression set (22 hours 70° C., 50%) __percent__ 5.0

Example 9

(a) Preparation of foam stabilizer.—About 200 parts of a basic polyether of OH number 65 which has been prepared from N-dodecyldiethanolamine by polycondensation in the presence of 1% phosporus acid at 180 to 200° C. are reacted at 80 to 90° C. with about 341 parts of the polyether isocyanate obtained according to Example 1(a). The resulting product is a pale yellow oil ($n_D^{20}=1.4771$).

(b) Process according to the invention.—The following components are thoroughly stirred together in a mixing chamber and the reaction mixture is introduced into molds or placed on the conveyor band of a foaming machine.

About 100 parts of a slightly branched polyester of diethylene glycol and trimethylolpropane (molecular weight 2,500, hydroxyl number 60)
About 4 parts of water
About 1.5 parts of N-methylmorpholine
About 0.5 part of the compound prepared according to 9(a)
About 50 parts of tolylene diisocyanate (65% 2,4- and 35% 2,6-isomer).

Foam formation starts after 8 seconds and is finished after 50 seconds. A very fine cellular soft polyester foam which has the following physical properties has formed:

Density _____kg./m.³__ 33
Tensile strength _____kg. wt./cm.²__ 1.1
Elongation at break _____percent__ 105
Compression deflection (at 40% deflection)
p./cm.²__ 74
Compression set (22 hours 70° C., 90%) __percent__ 14

Example 10

(a) Preparation of foam stabilizer.—About 250 parts of N,N'-di-octadecenoyl-N-(2-hydroxyethyl)-ethylene diamine (prepared from N-(2-hydroxyethyl)-ethylene diamine and methyl oleate) are reacted at about 90° C. with about 668 parts of the polyether isocyanate prepared according to Example 1(a). The reaction product is a pale yellow oil.

(b) Process according to the invention.—About 4 parts of the compound prepared according to (a) are mixed with the following components:

About 100 parts of slightly branched polyester of adipic acid, diethyl glycol and trimethylol propane (molecular weight 2500, hydroxyl number 60),
About 3 parts of water,
About 1.25 parts of dimethylbenzylamine,
About 40 parts of tolylene diisocyanate (65% 2,4- and 35% 2,6-isomer).

Foam formation starts after about 5 seconds and is finished after a further 70 seconds. A fine cellular, soft polyester urethane foam which has the following physical properties is formed:

Density _____kg./m.³__ 44
Tensile strength _____kg. wt./cm.²__ 1.4
Elongation at break _____percent__ 140
Compression deflection (at 40% deflection)
p./cm.²__ 76
Compression set ( 22 hours 70° C., 50%) __percent__ 3.7

Example 11

(a) Preparation of foam stabilizer.—About 220 parts of stearic acid N-(2-hydroxyethyl)-amide are heated at about 90° C. for about 30 minutes in admixture with about 1,000 parts of the polyether isocyanate prepared according to Example 1(a). The reaction product is a colorless wax.

(b) Process according to the invention.—About 0.75 part of the compound prepared according to (a) is intimately mixed with the following components, using a mechanical stirrer; these components yield a soft, elastic polyurethane foam based on a polyester:

About 100 parts of a slightly branched polyester of adipic acid, diethylene glycol and trimethylolpropane (molecular weight 2500, hydroxyl number 60),
About 1.25 parts of dimethylbenzylamine,
About 4 parts of water and
About 50 parts of tolylene diisocyanate (65% of 2,4- and 35% of 2,6-isomer).

Foam formation starts after 5 seconds is finished after 65 seconds. The resulting foam has the following physical properties:

Density _____kg./m.³__ 34
Tensile strength _____kg. wt./cm.²__ 1.1
Elongation at break _____percent__ 100
Compression deflection (at 40% deflection)
p./cm.²__ 72
Compression set (22 hours 70° C., 50%) __percent__ 13.0

Example 12

(a) Preparation of foam stabilizer.—About 160 parts of oleic acid diethanolamide are reacted at about 90° C. with about 1.142 parts of the polyether isocyanate prepared according to Example 1(a). The reaction product is a clear brown oil ($n_D^{20}=1.4810$).

(b) Process according to the invention.—About 0.25 part of the compound prepared according to (a) is intimately mixed with the following components, using a stirrer (1,500 revs./min.):

About 100 parts of a slightly branched polyester of adipic acid, diethylene glycol and trimethylolpropane (molecular weight 2,500, hydroxyl number 60),
About 1.25 parts of dimethylbenzylamine,
About 4 parts of water,
About 50 parts of tolylene diisocyanate (65% 2,4- and 35% 2,6-isomer).

The mixture becomes cloudy after 5 seconds, which is a sign that foam formation has started, and expansion of the mixture is finished after 68 seconds. A very fine cellular polyurethane foam which has the following physical properties is formed:

Density _____kg./m.³__ 34
Tensile strength _____kg. wt./cm.²__ 1.1
Elongation at break _____percent__ 100
Compression deflection (at 40% deflection)
  p./cm.²__ 72
Compression set (22 hours, 70° C., 50%)__percent__ 13.0

Example 13

(a) Preparation of foam stabilizer.—About 63.5 parts of N-di-(2-hydroxyethyl)-9-aminoheptadecane are mixed with about 400 parts of the polyether isocyanate obtained according to Example 8(a) and heated for about 30 minutes at about 90° C., the NCO content of the mixture falling to zero. The reaction product is a pale yellow wax which forms a clear solution in water.

(b) Process according to the invention.—About 1 part of the compound prepared according to (a) is intimately mixed with the following components:

About 100 parts of a slightly branched polyester of adipic acid, diethylene glycol and trimethylolpropane (molecular weight 2,500, hydroxyl number 60),
About 1.25 parts of dimethylbenzylamine,
About 4 parts of water, and
About 50 parts of tolylene diisocyanate (65% 2,4- and 35% 2,6-isomer).

Foam formation starts after about 5 seconds and is finished after 60 seconds. The very fine cellular foam obtained has the following physical properties:

Density _____kg./m.³__ 29
Tensile strength _____kg. wt./cm.²__ 1.1
Elongation at break _____percent__ 100
Compression deflection (at 40% deflection)
  p./cm.²__ 63
Compression set (22 hours, 70° C., 50%)__percent__ 12.5

Example 14

(a) Preparation of foam stabilizer.—About 52.5 parts of N-dodecyl-diethanolamine are reacted at about 90° C. with about 400 parts of the polyether isocyanate prepared according to Example 8(a). The reaction product obtained is a clear, water-soluble oil which solidifies to a colorless wax at room temperature.

(b) Process according to the invention.—About 3 parts of the compound prepared according to (a) are intimately mixed with the following components, using a mechanical stirrer:

About 100 parts of a silghtly branched polyester of adipic acid, diethylene glycol and trimethylolpropane (molecular weight 2,500, hydroxyl number 60),
About 1.25 parts of dimethylbenzylamine,
About 4 parts of water,
About 25 parts of tolylene diisocyanate (64% 2,4- and 35% of 2,6-isomer), and
About 25 parts of toluylene diisocyanate (80% 2,4- and 20% 2,6-isomer).

Foam formation starts after about 5 seconds and is completed after about 60 seconds.

The resulting fine cellular foam has the following physical properties:

Density _____kg./m.³__ 29
Tensile strength _____kg. wt./cm.²__ 1.4
Elongation at break _____percent__ 100
Compression deflection (at 40% deflection)
  p./cm.²__ 87
Compression set (22 hours, 70° C., 50%)__percent__ 23

Example 15

About 2.0 parts of a commercial reaction product of a fatty acid amide and ethylene oxide, e.g., a reaction product of 1 mol of stearic acid amide and 15 mols of ethylene oxide, are intensively mixed with the following components:

About 100 parts of a slightly branched polyester of adipic acid, diethylene glycol and trimethylolpropane (molecular weight 2,500, hydroxyl number 60),
About 1.25 parts of dimethylbenzylamine,
About 4 parts of water, and
About 50 parts of tolylene diisocyanate (80% 2,4- and 20% 2,6-isomer).

Foam formation starts after about 5 seconds and is finished after about 65 seconds. The resulting fine cellular, soft foam has good physical properties.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention.

What is claimed is:
1. Compounds having the formula

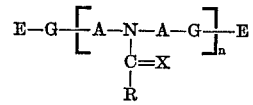

or

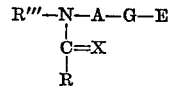

wherein
R is alkyl, alkenyl, cycloalkyl, aralkyl or aryl having 6 to 20 carbon atoms;
A is alkylene having 2 to 10 carbon atoms;
X is oxygen or two hydrogen atoms;
n is an integer of 1 to 30;
G is —OOC—NH—R′—NH—COO—, where R′ is alkylene or arylene having 2 to 20 carbon atoms;
E is the group —D—R″ where R″ is hydroxyl, an alkoxy group having from one to six carbon atoms or phenoxy and D is the radical of a polyether compound of 30 to 100 mol percent alkylene oxide and 0–70 mol percent of another monoepoxide; and
R‴ is an alkyl, alkenyl, cycloalkyl, aralkyl or aryl radical having 1 to 20 carbon atoms.

2. The compounds of claim 1 having the formula

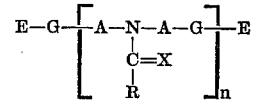

3. The compounds of claim 1 having the formula

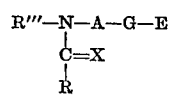

4. The compounds of claim 1 having the formula

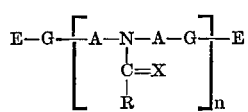

wherein
- R is alkyl, alkenyl or cycloalkyl having 6 to 20 carbon atoms;
- A is alkylene having 2 to 10 carbon atoms;
- X is two hydrogen atoms;
- $n$ is an integer of 1 to 30;
- G is —OOC—NH—R'—NH—COO— where R' is arylene and
- E is the group —D—R" where R" is an alkoxy group having from one to six carbon atoms and D is the radical of a polyether composed of 30 mol percent to 100 mol percent of ethylene oxide and 0 mol percent to 70 mol percent of another monoepoxide.

5. The compound of claim 4 wherein R is $C_{16}H_{31}$, A is —$CH_2$—$CH_2$—, $n$ is 1, G is

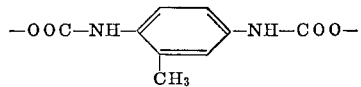

R" is —O—$C_4H_9$ and D is the radical of a polyether composed of 50 mol percent of ethylene oxide and 50 mol percent of propylene oxide.

References Cited
UNITED STATES PATENTS 3,284,220   11/1966   Anagnostopoulos et al.
                                                             260—2.5

LORRAINE A. WEINBERGER, Primary Examiner

L. A. THAXTON, Assistant Examiner

U.S. Cl. X.R.

260—2.5 A, 45.85, 404, 404.5, 482 B, 558 R, 570.6, 584 B